United States Patent [19]

Neely

[11] Patent Number: 5,092,904
[45] Date of Patent: Mar. 3, 1992

[54] METHOD FOR DYEING FIBROUS MATERIALS

[75] Inventor: Nigel E. Neely, Rock Hill, S.C.

[73] Assignee: Springs Industries, Inc., Fort Mill, S.C.

[21] Appl. No.: 525,776

[22] Filed: May 18, 1990

[51] Int. Cl.$^5$ .............................................. C09B 67/00
[52] U.S. Cl. ........................................ 8/574; 8/490; 8/DIG. 21; 57/904
[58] Field of Search ........... 8/574, 490, 572, DIG. 21; 57/904

[56] References Cited

U.S. PATENT DOCUMENTS

| | | | |
|---|---|---|---|
| 2,895,948 | 7/1959 | Brinker et al. | 260/78.4 |
| 3,558,267 | 8/1967 | Langford | 8/172 |
| 3,741,719 | 6/1973 | Ramanathan | 8/39 |
| 3,789,091 | 1/1971 | Anderson et al. | 260/927 |
| 4,073,615 | 2/1978 | Lacroix et al. | 8/25 |
| 4,397,759 | 8/1983 | Hancock | 252/609 |
| 4,525,168 | 6/1985 | Kelly | 8/130.1 |
| 4,705,523 | 11/1987 | Hussamy | 8/490 |
| 4,710,200 | 12/1987 | Cates et al. | 8/574 |
| 4,752,300 | 6/1988 | Johnson | 8/584 |
| 4,758,649 | 7/1988 | Asano et al. | 528/73 |
| 4,842,761 | 6/1989 | Rutherford | 512/4 |
| 4,898,596 | 2/1990 | Riggins et al. | 8/490 |
| 4,961,871 | 10/1990 | Michael | 512/4 |
| 4,973,422 | 11/1990 | Schmidt | 512/4 |

FOREIGN PATENT DOCUMENTS 1275459 5/1972 United Kingdom .
1282133 7/1972 United Kingdom .

OTHER PUBLICATIONS

Evaluation of the STX System for Solvent Dyeing of Industrial Fabrics Part II:, Fred L. Cook and Madeline L. Averette.

Aramid Fibers, Kirk-Othmer: The Encyclopedia of Chemical Technology Third Edition, vol. 3, pp. 213-242 (1979).

Primary Examiner—Prince Willis, Jr.
Assistant Examiner—John F. McNally
Attorney, Agent, or Firm—Bell, Seltzer, Park & Gibson

[57] ABSTRACT

A method for dyeing fibrous material is provided. The method includes contacting a fibrous material with a mixture of a carrier and a dye soluble or dispersed in the carrier. The improvement comprises the use, as the carrier, of a mixture comprising N-cyclohexyl-2-pyrrolidone and an alkyl or aryl benzoate. The carrier system of the present can be utilized advantageously to dye difficult to dye fibrous material such as aromatic polyamides including Kevlar ® fibers and blends thereof with other fibers.

56 Claims, No Drawings

METHOD FOR DYEING FIBROUS MATERIALS

The present invention relates to a method for dyeing fibrous material, and particularly fibrous materials which are difficult to dye such as aromatic polyamides, polybenzimidazoles or aromatic polyimides.

BACKGROUND OF THE INVENTION

There are numerous recognized methods for dyeing and/or incorporating additives into fibers and other fibrous materials, consisting primarily of methods which utilize organic solvents such as dimethylsulfoxide ("DMSO"), dimethylacetamide ("DMAc"), dimethylformamide ("DMF"), N-methylpyrrolidone ("NMP"), acetophenone, acetanilide and methyl benzoate. Exemplary systems utilizing these organic solvents have been proposed in U.S. Pat. Nos. 3,558,267 to Langenfeld, 3,741,719 to Ramanathan et al and 4,525,168 to Kelly, and U.K. Patent Nos. 1,275,459 to Gruen and 1,282,113 to Burtonshaw et al.

One particular solvent which has been proposed is N-cyclohexyl-2-pyrrolidone ("CHP"). Processes utilizing this particular solvent are proposed in U.S. Pat. No. 4,073,615 to Lacroix et al which utilize a glycol or glycol ether in combination with N-cyclohexyl-2-pyrrolidone to dye polyamide fibers, and more recently in U.S. Pat. No. 4,898,596 to Riggins et al to dye poly(m-phenyleneisophthalamide) and polybenzimidazoles.

Despite the general availability of dyeing processes using solvents including N-cyclohexyl-2-pyrrolidone, there continues to be a desire for process improvements which enhance the dyeability of fibers, for example, by permitting the substantially full exhaustion of dyes and additives such as flame retardants into the fibers. This is particularly important in difficult to dye fibers, for example, aromatic polyamides such as poly(m-phenyleneisophthalamide) ("Nomex®") and poly(p-phenyleneterephthalamide) ("Kevlar®"), polybenzimidazoles ("PBI") and aromatic polyimides.

In addition to the general desire for process improvements to enhance dyeability, the prior art also acknowledges that there is a continuing need for any system which would be effective to and uniformly dye Kevlar® fibers and blends of Kevlar® with other fibers. This problem is described, for example, in "Evaluation of the STX® System for Solvent Dyeing of Industrial Fabric Part II: Kevlar® Aramid and PBI® Fabrics", Cook et al, *Journal of Industrial Fabrics*, vol. 2, No. 1, Summer 1983 and U.S. Pat. No. 4,898,596 to Riggins et al. This problem is particularly acute for the most commonly available Nomex® product, namely Nomex® T-455. Nomex® T-455 includes 5 percent Kevlar®, and despite the availability of methods for dyeing 100 percent Nomex® there are no effective methods for uniformly dyeing the Kevlar® fraction of Nomex® T-455.

It is therefore an object of the present invention to provide an improved method for dyeing fibrous materials, and particularly to provide a method which provides particularly advantageous results, for example, more uniform dyeing, when used with difficult to dye fibers such as aromatic polyamide fibers including Kevlar® fibers, polybenzimidazole fibers, aromatic polyimide fibers, copolymers of the monomers thereof and blends thereof.

SUMMARY OF THE INVENTION

This invention relates to a method for dyeing fibrous material which includes contacting the fibrous material with a mixture (e.g., a solution or dispersion) of a dye in a particular dye carrier comprising a mixture of N-cyclohexyl-2-pyrrolidone and an alkyl or aryl benzoate. The benefits, for example, more uniform dyeing, achievable through the use of this mixture are particularly surprising in that the class of alkyl and aryl benzoates are generally considered ineffective for use as carriers in the dyeing of aromatic polyamides, polybenzimidazoles and aromatic polyimides. Similarly the prevailing wisdom, as exemplified in Riggins et al, suggests that N-cyclohexyl-2-pyrrolidone is ineffective for use in dyeing Kevlar®, copolymers or blends of Kevlar® with other polymers and fibers.

It has been discovered that a mixture of N-cyclohexyl-2-pyrrolidone and methyl benzoate provides a particularly effective carrier system for use in uniformly dyeing fibrous material, and especially for use in uniformly dyeing Nomex®, Kevlar®, polybenzimadazoles, polyimides, copolymers of the monomers thereof, and blends therewith.

DETAILED DESCRIPTION OF THE INVENTION

As summarized above, the present invention provides an improved carrier system and carrier-based method for dyeing or incorporating additives into fibrous materials. The improvement resides in the use of an improved dye carrier comprising a mixture of N-cyclohexyl-2-pyrrolidone and an alkyl or aryl benzoate. In accordance with the prior art methods, dyeing is typically carried out by forming a mixture (e.g., a bath, solution, dispersion and the like) of the dye and/or additive and the carrier of the present invention. In accordance with the present invention, a fibrous textile material, e.g., fiber, web, yarn, thread, sliver, woven fabric, knitted fabric, non-woven fabric, and the like is impregnated, padded, or otherwise contacted with the bath using conventional equipment such as jet dyeing equipment.

The carrier of the present invention comprises a mixture of N-cyclohexyl-2-pyrrolidone and an alkyl or aryl benzoate. Suitable alkyl benzoates include ethyl benzoate, methyl benzoate, butyl benzoate, propyl benzoate, isopropyl benzoate, isobutyl benzoate and the like. Suitable aryl benzoates include benzyl benzoate, phenyl benzoate and the like. Preferably the benzoate is in emulsified form. A particularly preferred benzoate is methyl benzoate which has been emulsified such that the emulsion contains about 25 to about 35 percent methyl benzoate.

Preferably, the weight ratio of N-cyclohexyl-2-pyrrolidone to alkyl or aryl benzoate in emulsified form in the carrier system of the present invention is from about 2:3 to about 8:1, and more preferably about 4:1. The total weight of the carrier in the dyebath will be in the range from about 1 to about 3 percent based on the weight of the dyebath. The weight percent can be adjusted using water or any other liquid miscible with the carrier. The carrier can also include other additives such as flame retardants, softeners, UV absorbers, IR absorbers, antistatic agents, antifoaming agents, or the like.

In view of the desirable results achieved to date, it is thought that the use of the dye carrier of the present invention is applicable to a wide variety of fibrous material and includes dyed fibers which have been formed into fabrics including woven, non-woven or knit fabrics, for example. Exemplary fibers preferably include synthetic fibers such as polyesters; polyolefins, e.g., polyethylene, polypropylene, etc.; aliphatic polyamides, e.g., nylon 6, nylon 66, etc.; aromatic polyamides; polybenzimidazoles; and aromatic polyimides; copolymers, and blends thereof.

As noted above the carrier is particularly desirable for use with aromatic polyamides. Fibers of aromatic polyamides are often generically termed "aramid fibers" and are described, for example, in *Kirk-Othmer: The Encyclopedia of Chemical Technology*, Third Edition, Vol. 3, pp. 213-242, the disclosure of which is incorporated herein by reference. The term "aromatic polyamides" or "aramids" includes but is not limited to poly(m-phenyleneisophthalamide) ( e.g., Nomex®), poly(p-phenyleneterephthalamide) (e.g., Kevlar®), polyparabenzamide, copolymers of the monomers thereof, and blends therewith. Nomex® is available from DuPont of Wilmington, De., in three forms. Nomex® T-450 is 100 percent, undyed poly(m-phenyleneisophthalamide); Nomex® T-456 is 100 percent solution dyed poly(m-phenyleneisophthalamide); and Nomex® T-455 is a blend of 95 percent Nomex® and 5 percent Kevlar®. Nomex® T-455 with the 5 percent Kevlar® fraction is the most common type of Nomex® used commercially. In view of the ability to dye the Kevlar® fraction of Nomex® T-455 more uniformly at a temperature above about 250° F., it is believed that the carrier of the present invention can be used at temperatures above about 250° F. to dye blends of other fibers with in a more uniform manner.

Another preferred group of fibers are the polybenzimidazole fibers available from Höechst-Celanese of Charlotte, N.C. and are described in U.S. Pat. No. 2,895,98 to Brinker et al, the disclosure of which is incorporated herein by reference. Polybenzimidazoles use specific dicarboxylic and tetramine compounds as monomers and have the repeating unit of the formula

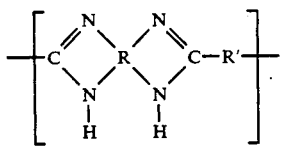

Another preferred group of fibers are aromatic polyimide fibers described in U.S. Pat. No. 4,758,649 to Asano et al, the disclosure of which is incorporated herein by reference. The aromatic polyimides have the repeating unit of the formula

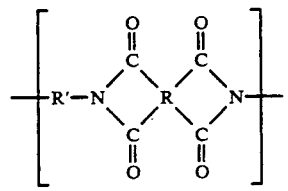

In addition, copolymers of monomers or blends of the aromatic polyamides, polybenzimidazoles and/or aromatic polyimides can be used as the fibers. For example, aromatic polyamide fibers and polybenzimidazole fibers can be blended in a weight ratio of about 60:40 to about 80:20 aromatic polyamide fibers to polybenzimidazole fibers. The blends can be in the form of intimate blends, draw blends, corespun and the like.

Suitable dyes for use in the present method can include acid dyes (e.g., azo, triarylmethane, anthraquinone dyes etc.); basic dyes (e.g., triphenylmethane, thiazine dyes, etc.); direct dyes (e.g. sulphonated azo dyes etc.); mordant dyes; vat dyes; disperse dyes (e.g., nitroarylamine, azo, or anthraquinone dyes and the like with amino groups); direct dyes; reactive dyes; and mixtures thereof. Particularly effective dyes for dyeing aromatic polyamide fibers, polybenzimidazole fibers and aromatic polyimide fibers are the basic dyes (sometimes referred to as "cationic dyes"). An example of this class are the Basacryl® dyes available from BASF, Charlotte, N.C.

Flame retardants suitable for use as an additive can include, inter alia, those based on cyclic phosphonate esters such as those available from Albright & Wilson of Richmond, Va. under the trademark Antiblaze 100®, and are described, for example, in U.S. Pat. Nos. 3,789,091 to Anderson et al and 4,397,759 to Hancock, the disclosures of which are incorporated herein by reference.

In operation, the dye and/or additive is preferably applied to the fibers of a fabric using a one-step batch-type process at 100° F. to 300° F. at 1 to 3 atm pressure. No pretreatment of the fabric is required. Fabric can be dyed by passing the fabric through a hot aqueous scour in a jet dye machine or other pressurized scouring equipment. The jet is then charged with the present carrier and the dye and/or additive. The temperature and pressure are then increased to a temperature above about 250° F. and preferably about 270° F. and a pressure above about 2.5 atm pressure and held for about 30 minutes to about 1.5 hours while the jet is working. The fabric is allowed to cool, the dyebath removed and a post scour is performed using a wetting agent and soda ash in the jet. Typically the resulting fabric has about 70 percent to about 98 percent of the dye depending on the dye exhausted onto the fabric based on weight of dye in the dyebath.

Additional benefits and advantages of the invention will be apparent in the following illustrative examples.

EXAMPLES

Example 1

Using Nomex® T-455 (95% Nomex® and 5% Kevlar®) fibers and a jet dye apparatus, the jet was loaded with fresh water and the temperature of the fabric formed from the fibers was raised to 190° F. and run for 20 minutes. The fabric was rinsed clear using cold water.

A dye run was done with a dyebath including 20 g/l of carrier having a weight ratio of 4:1 N-cyclohexyl-2-pyrrolidone to emulsified methyl benzoate. The bath was set below about 120° F. and run for 10 minutes. A navy blue cationic dye comprising 3.75% Basacryl Blue X-3GL, 1.41% Basacryl Red GL and 0.90% Basacryl Golden Yellow X-GFL (weight on fiber) was added and run in the jet for 10 minutes. 20 g/l of sodium nitrate (retarding agent) was added over a 10 minute period followed by formic acid. The temperature was raised to 270° F. at 3° F./minute increments. The fabric was then dyed for an extended period of 60 minutes at an elevated temperature of about 270° F. and at a pressure of about 2.85 atm. The dyed fabric was cooled to 160° F. and the shade checked. When the shade was acceptable, the dyebath was dropped and the fabric was rinsed clean in cold water.

A post scour was done in a bath comprising 0.125% wetting agent and 0.5% soda ash. The temperature was raised to 180° F. and the fibers of the fabric scoured for 20 minutes at 180° F. The fabric was cooled and rinsed until the rinse was clear. The fabric was then dried.

The shade of the fabric was determined subjectively by sight, and objectively using the L*, a*, b* scale. The latter uses a colorimeter available from HunterLab of Fairfax, Va. set at 10° illumination and having a D65 light source. The L*, a*, b* scale is based on the opponent-colors theory of color vision which presumes that in the human eye there is an intermediate signal-switching stage between the light receptors in the retina and the optic nerve taking color signals to the brain. In this switching stage, red responses are compared with green to generate a red-to-green color dimension. The green (or red and green together, depending on theory used) response is compared in a similar manner with the blue to generate a yellow-to-blue color dimension. These two dimensions are often, though not always, associated with the symbols "a*" and "b*", respectively. The necessary third dimension, "L*", for lightness, is usually a non-linear function such as the square root or cube root of one of the dimensions. Additionally a Delta E value can be determined to compare shades of like fabrics using the formula.

$$DELTA\ E = [(Delta\ L)^2 + (Delta\ a)^2 + (Delta\ b)^2]^{\frac{1}{2}}$$

The fabric of Example 1 had an excellent shade of navy blue, had a L* of 18.54, an a* of 1.17 and a b* of −7.78, and the shade was used as the control for Delta E values of the dye shades obtained on Nomex ® T-455 in the examples detailed below. Stated otherwise, the shade of the examples below were compared to the shade of Example 1, and the lower the value of the Delta E as measured, the closer the shade of the fabric.

Example 2

The steps of Example 1 were repeated except that a weight ratio of 3:2 N-cyclohexyl-2-pyrrolidone to emulsified methyl benzoate was used.

The resulting shade of the fabric was good, had an L* of 19.02, an a* of 0.99 and a b* of −8.20, and had a Delta E value of 0.67 as compared to the shade obtained by using the process of Example 1.

Example 3

The steps of Example 1 were repeated except that a weight ratio of 2:3 N-cyclohexyl-2-pyrrolidone to emulsified methyl benzoate was used.

The resulting shade of the fabric was light, had an L* of 19.93, and a* of 1.99 and a b* of −9.50, and had a Delta E value of 2.36 as compared to the shade obtained by using the process of Example 1.

Example 4

The steps of Example 1 were repeated except 100% emulsified methyl benzoate was used. The resulting fabric was essentially undyed and had an L* of 24.84, an a* of 5.69 and a b* of −23.73. The results of this example confirm that methyl benzoate is ineffective in dyeing aromatic polyamides when used alone.

Example 5

The steps of Example 1 were repeated except 100% N-cyclohexyl-2-pyrrolidone was used.

The shade of the dyed fabric was noticeably non-uniform, particularly the Kevlar ® fraction and had an L* of 18.07, an a* of 1.35 and a b* of −6.69 as compared to the more level shade obtained by using the process of Example 1. The results of this example confirm the advantages of including methyl benzoate in the N-cyclohexyl-2-pyrrolidone carrier system to afford more uniform dyeings of Kevlar ® blends such as are found in Nomex ® T-455 fibers and fabrics thereof.

Example 6

In order to further demonstrate the effectiveness of the present carrier, the steps of Example 1 were repeated except the fiber used was 100% Kevlar ® and the navy blue cationic dye comprised 4.875% Basacryl blue X-3GL, 0.93% Basacryl Red GL and 1.00% Basacryl yellow X-GFL (weight on fabric).

The resulting fabric had a deep shade of blue, an L* of 16.66, an a* of 1.16 and a b* of −1.07. This demonstrates the particular suitability of the present dye carrier for use in dyeing 100% Kevlar ®.

Example 7

In order to further demonstrate the effectiveness of the present carrier with blends of fibers, the steps of Example 1 were repeated except the fiber used was a PBI/Nomex ® T-455 20:80 blend and 25 g/l of the carrier was used.

The resulting dyed fabric had a uniform deep shade of blue and an L* of 19.82, an a* of 0.71 and a b* of −10.85. This demonstrates the suitability of the use of the present carrier in uniforming dyeing blends of PBI and Nomex ® fibers.

Example 8

The steps of Example 1 were repeated except the fiber used was a PBI/Kevlar ® 40:60 blend.

The resulting dyed fabric had a deep shade of blue and an L* of 20.97, an a* of 0.40 and a b* of −1.00. This demonstrates the suitability of the use of the present carrier in dyeing fabric blends of polybenzimidazole and Kevlar ® fibers.

In the specification and examples, there have been disclosed preferred embodiments of the invention, although specific terms are employed, they are used in a generic and descriptive sense only and not for the purpose of limitation, the scope of the invention being defined by the following claims.

That which is claimed is:

1. In a method for dyeing fibrous material which includes the step of contacting a fibrous material selected from the group consisting of fibers of aromatic polyamides, polybenzimidazoles, aromatic polyimides, copolymers of the monomers thereof, or blends thereof, with a mixture of a carrier and a dye soluble or dispersed in the carrier, the improvement comprising an effective amount, as the carrier, of a mixture comprising N-cyclohexyl-2-pyrrolidone and an alkyl or aryl benzoate wherein the weight ratio of N-cyclohexyl-2-pyrrolidone to alkyl or aryl benzoate is from about 2:3 to about 8:1.

2. A method according to claim 1 wherein the aromatic polyamide is poly(m-phenyleneisophthalamide), poly(p-phenyleneterephthalamide), copolymers of the monomers thereof, or blends thereof.

3. A method according to claim 1 wherein the fiber comprises a blend of aromatic polyamide and polybenzimidazole fibers.

4. A method according to claim 4 wherein the blend of aromatic polyamide and polybenzimidazole fibers is in a weight ratio of about 60:40 to about 80:20.

5. A method according to claim 1 wherein the weight ratio of N-cyclohexyl-2-pyrrolidone to alkyl or aryl benzoate in emulsified form is from about 2:3 to about 8:1.

6. A method according to claim 5 wherein the weight ratio of N-cyclohexyl-2-pyrrolidone to alkyl or aryl benzoate in emulsified form is about 4:1.

7. A method according to claim 1 wherein the dye soluble or dispersible in the carrier is selected from the group consisting of acid dyes, basic dyes, mordant dyes, vat dyes, disperse dyes, direct dyes and reactive dyes.

8. A method according to claim 1 wherein the mixture of the carrier and the dye includes a flame retardant additive.

9. A method according to claim 1 wherein the alkyl or aryl benzoate is emulsified methyl benzoate.

10. A method according to claim 1 wherein the amount of dye exhausted on the fibrous material is from about 70 percent to about 98 percent based on the weight of the dye in the mixture of the carrier and the dye.

11. A method according to claim 1 wherein the fibrous material is contacted with the mixture of the carrier and the dye at a temperature of from about 100° F. to about 300° F. and at from about 1 to about 3 atm pressure.

12. A method according to claim 11 wherein the fibrous material is contacted with the mixture of the carrier and the dye at a temperature of above about 250° F. and at a pressure above about 2.5 atm, and held at the temperature and pressure for about 30 minutes to about 1.5 hours.

13. A fabric in which the fibers are dyed by the method of claim 1.

14. In a method for dyeing and/or flame retarding fibers which includes the step of contacting aromatic polyamide fibers, polybenzimidazole fibers, aromatic polyimides, copolymers of the monomers thereof, or blends thereof with a mixture of a carrier and a dye and/or flame retardant soluble or dispersed in the carrier, the improvement comprising the use, as the carrier, of a mixture comprising N-cyclohexyl-2-pyrrolidone and an alkyl or aryl benzoate in emulsified form in a weight ratio of N-cyclohexyl-2-pyrrolidone to alkyl or aryl benzoate of from about 2:3 to about 8:1.

15. A method according to claim 14 wherein the dye soluble or dispersed in the carrier is selected from the group consisting of acid dyes, basic dyes, mordant dyes, vat dyes, disperse dyes, direct dyes and reactive dyes.

16. A method according to claim 14 wherein the blend of aromatic polyamide and polybenzimidazole fibers is in a weight ratio of about 60:40 to about 80:20.

17. A method according to claim 14 wherein the alkyl or aryl benzoate is emulsified methyl benzoate.

18. A method according to claim 14 wherein the amount of dye and/or flame retardant exhausted on the fibers is from about 70 percent to about 98 percent based on the weight of the dye and/or flame retardant in the mixture of the carrier and of the dye and/or flame retardant.

19. A method according to claim 14 wherein the fibers are contacted with the mixture of the carrier and the dye and/or flame retardant at a temperature of from about 100° F. to about 300° F. and at from about 1 to about 3 atm pressure.

20. A method according to claim 19 wherein the fibers are contacted with the mixture of the carrier and the dye at a temperature of above about 250° F. and at a pressure above about 2.5 atm, and held at the temperature and pressure for about 30 minutes to about 1.5 hours.

21. A fabric in which the fibers are dyed by the method of claim 14.

22. In a method for dyeing fibers which includes the step of contacting poly(p-phenyleneterephthalamide) fibers with a mixture of a carrier and a dye soluble or dispersed in the carrier, the improvement comprising the use, as the carrier, of a mixture comprising N-cyclohexyl-2-pyrrolidone and an alkyl or aryl benzoate wherein the weight ratio of N-cyclohexyl-2-pyrrolidone to alkyl or aryl benzoate is from about 2:3 to about 8:1.

23. A method according to claim 22 wherein the poly(p-phenyleneterephthalamide) fibers are copolymerized with monomers or a blend of fibers of other aromatic polyamides, polybenzimidazoles or, aromatic polyimides.

24. A method according to claim 23 wherein the blend of fibers of poly(p-phenyleneterephthalamide) and fibers of polybenzimidazole is in a weight ratio of about 60:40 to about 80:20.

25. A method according to claim 22 wherein the weight ratio of N-cyclohexyl-2-pyrrolidone to alkyl or aryl benzoate in emulsified form is about 4:1.

26. A method according to claim 22 wherein the dye soluble or dispersed in the carrier is selected from the group consisting of acid dyes, basic dyes, mordant dyes, vat dyes, disperse dyes, direct dyes and reactive dyes.

27. A method according to claim 22 wherein the mixture of the carrier and the dye includes a flame retardant additive.

28. A method according to claim 22 wherein the alkyl or aryl benzoate is emulsified methyl benzoate.

29. A method according to claim 22 wherein the amount of dye exhausted on the poly(p-phenyleneterephthalamide) is from about 70 percent to about 98 percent based on the weight of the dye in the mixture of the carrier and the dye.

30. A method according to claim 22 wherein the poly(p-phenyleneterephthalamide) is contacted with the mixture of the carrier and the dye at a temperature of from about 100° F. to about 300° F. and at from about 1 to about 3 atm pressure.

31. A method according to claim 30 wherein the poly(p-phenyleneterephthalamide) is contacted with the mixture of the carrier and the dye at a temperature of above about 250° F. and at a pressure above about 2.5 atm, and held at the temperature and pressure for about 30 minutes to about 1.5 hours.

32. A fabric in which the poly(p-phenyleneterephthalamide) fibers are dyed by the method of claim 22.

33. A fibrous material selected from the group consisting of fibers of aromatic polyamides, polybenzimidazoles, aromatic polyimides, copolymers of the monomers thereof, or blends thereof, which has been dyed with a mixture of an effective amount of a carrier and a dye soluble or dispersed in the carrier, the carrier comprising a mixture of N-cyclohexyl-2-pyrrolidone and an alkyl or aryl benzoate wherein the weight ratio of N-cyclohexyl-2-pyrrolidone to alkyl or aryl benzoate is from about 2:3 to about 8:1.

34. A fibrous material according to claim 33 wherein the aromatic polyamide is poly(m-phenyleneisophthalamide), poly(p-phenyleneterephthalamide), copolymers of the monomers thereof, or blends thereof.

35. A fibrous material according to claim 33 wherein the fiber comprises a blend of aromatic polyamide and polybenzimidazole fibers.

36. A fibrous material according to claim 35 wherein the blend of aromatic polyamide and polybenzimidazole fibers is in a weight ratio of about 60:40 to about 80:20.

37. A fibrous material according to claim 33 wherein the weight ratio of N-cyclohexyl-2-pyrrolidone to alkyl or aryl benzoate in emulsified form is about 4:1.

38. A fibrous material according to claim 33 wherein the dye soluble or dispersed in the carrier is selected from the group consisting of acid dyes, basic dyes, mordant dyes, vat dyes, disperse dyes, direct dyes and reactive dyes.

39. A fibrous material according to claim 33 wherein the mixture of the carrier and the dye includes a flame retardant additive.

40. A fibrous material according to claim 33 wherein the alkyl or aryl benzoate is emulsified methyl benzoate.

41. A fabric formed from the fibrous material of claim 33.

42. A fiber of aromatic polyamides polybenzimidazoles, aromatic polyimides, copolymers of the monomers thereof or blends thereof which has been dyed and/or flame retarded with a mixture of a carrier and a dye and/or flame retardant soluble or dispersed in the carrier, the carrier comprising a mixture of N-cyclohexyl-2-pyrrolidone and alkyl or aryl benzoate in emulsified form in a weight ratio of N-cyclohexyl-2-pyrrolidone to alkyl or aryl benzoate of from about 2:3 to about 8:1.

43. A fiber according to claim 42 wherein the dye soluble or dispersed in the carrier is selected from the group consisting of acid dyes, basic dyes, mordant dyes, vat dyes, disperse dyes, direct dyes and reactive dyes.

44. A fiber according to claim 42 wherein the blend of aromatic polyamide and polybenzimidazole fibers is in a weight ratio of about 60:40 to about 80:20.

45. A fiber according to claim 42 wherein the alkyl or aryl benzoate is emulsified methyl benzoate.

46. A fiber according to claim 42 wherein the amount of dye and/or flame retardant exhausted on the fiber is from about 70 percent to about 98 percent based on the weight of the dye and/or flame retardant in the mixture of the carrier and the dye and/or flame retardant.

47. A fabric formed from the fibers of claim 42.

48. A fiber of poly(p-phenyleneterephthalamide) which has been dyed with a mixture of a carrier and a dye soluble or dispersed in the carrier, the carrier comprising a mixture of N-cyclohexyl-2-pyrrolidone and alkyl or aryl benzoate.

49. A fiber according to claim 48 wherein the fiber is copolymerized with monomers or a blend of fibers of other aromatic polyamides, polybenzimidazoles or aromatic polyimides.

50. A fiber according to claim 49 wherein the blend of aromatic polyamide and polybenzimidazole fibers is in a weight ratio of about 60:40 to about 80:20.

51. A fiber according to claim 48 wherein the amount of dye and/or flame retardant exhausted on the poly(p-phenyleneterephthalamide) is from about 70 percent to about 98 percent based on the weight of the dye and/or flame retardant in the mixture of the carrier and the dye.

52. A fiber according to claim 48 wherein the weight ratio of N-cyclohexyl-2-pyrrolidone to alkyl or aryl benzoate in emulsified form is about 4:1.

53. A fiber according to claim 48 wherein the dye soluble or dispersed in the carrier is selected from the group consisting of acid dyes, basic dyes, mordant dyes, vat dyes, disperse dyes, direct dyes and reactive dyes.

54. A fiber according to claim 48 wherein the mixture of the carrier and the dye includes a flame retardant additive.

55. A method according to claim 48 wherein the alkyl or aryl benzoate is emulsified methyl benzoate.

56. A fabric formed from the fibers of claim 48.

* * * * *

UNITED STATES PATENT AND TRADEMARK OFFICE
CERTIFICATE OF CORRECTION

PATENT NO.  : 5,092,904
DATED       : March 3, 1992
INVENTOR(S) : Nigel E. Neely It is certified that error appears in the above-identified patent and that said Letters Patent is hereby corrected as shown below:

Col. 3, line 38, "2,985,98" should read --2,895,948--.

IN THE CLAIMS:

Column 10, line 16, after "benzoate" insert -- wherein the weight ratio of N-cyclohexyl-2-pyrrolidone to alkyl or aryl benzoate is from about 2:3 to about 8:1 --.

Signed and Sealed this

Thirteenth Day of July, 1993

Attest:

MICHAEL K. KIRK

Attesting Officer

Acting Commissioner of Patents and Trademarks